H. N. ENHOLM.
TANK.
APPLICATION FILED APR. 23, 1918.
1,282,784.
Patented Oct. 29, 1918.
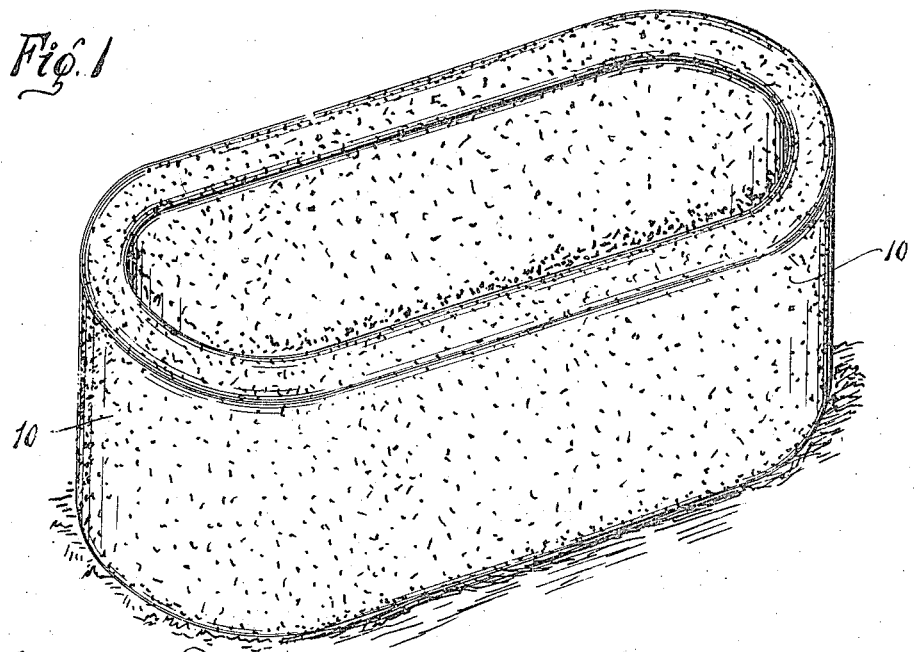
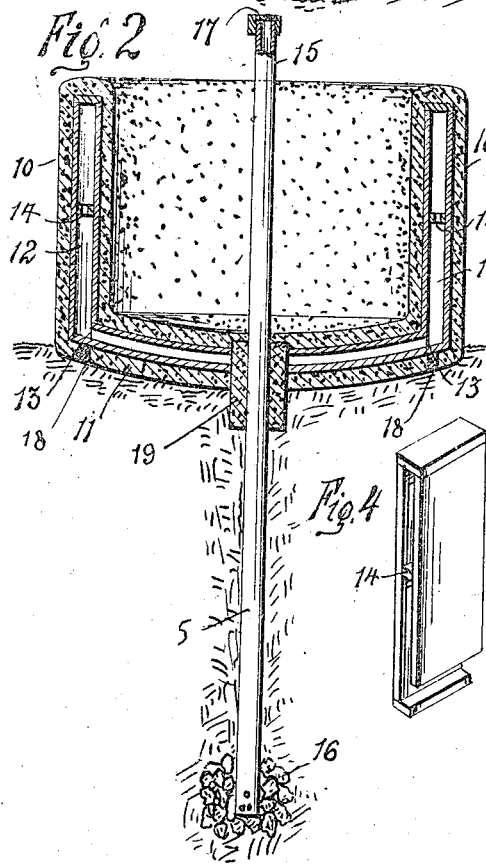
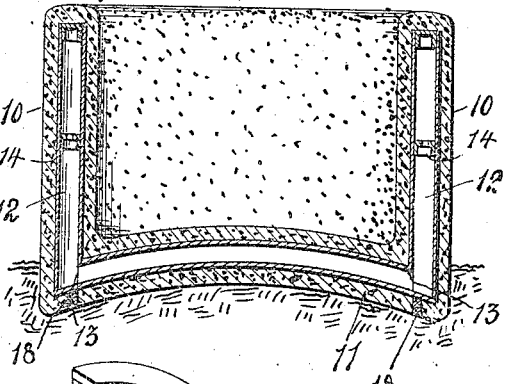
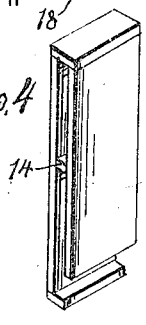
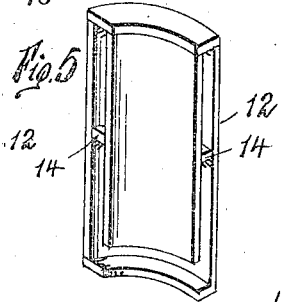
H. N. Enholm
INVENTOR
By Lacey Lacey
attys.

UNITED STATES PATENT OFFICE.

HILMER N. ENHOLM, OF BUSHNELL, ILLINOIS.

TANK.

1,282,784.　　　Specification of Letters Patent.　　Patented Oct. 29, 1918.

Application filed April 23, 1918. Serial No. 230,361.

*To all whom it may concern:*

Be it known that I, HILMER N. ENHOLM, a citizen of the United States, residing at Bushnell, in the county of McDonough and State of Illinois, have invented certain new and useful Improvements in Tanks, of which the following is a specification.

This invention relates to tanks and like receptacles constructed of cementitious material, and has for one of its objects to produce a device of this material having dead air spaces in its walls entirely inclosed by the material of which the tank is constructed.

Another object of the invention is to produce a device of this character having hollow core members within its walls with their interiors communicating and entirely inclosed by the material of which the tank is constructed.

Another object of the invention is to produce a tank having dead air spaces in its walls entirely inclosed by the material of which the tank is constructed and having a tubular member extending through the receptacle and into the ground below the frost line and terminating above the upper line of the receptacle.

Another object of the invention is to produce a device of this character having a plurality of hollow core members within its walls engaging end to end and with their interiors communicating and entirely inclosed by the material of which the tank is constructed.

With these and other objects in view, the invention consists in certain novel features of construction, as herein after shown and described and then specifically pointed out in the claims; and in the drawings illustrative of the preferred embodiment of the invention—

Figure 1 is a perspective view of the improved tank.

Fig. 2 is a transverse section.

Fig. 3 is a transverse section illustrating a modification in the construction of the bottom of the tank.

Figs. 4 and 5 are detached perspective views illustrating the construction of the core members.

The improved tank may be of any form or size, but for the purpose of illustration is shown oblong in outline as in Fig. 1, with rounded ends and with the bottom curved either downwardly as in Fig. 2 or upwardly as in Fig. 3.

The tank will be formed in suitable mold devices, not shown, as they form no part of the present invention. The vertical walls 10 and the bottom 11 of the tank are provided with dead air spaces communicating with each other, as shown in Figs. 2 and 3.

The dead air spaces are defined by core members, preferably in a plurality of hollow sections 12, constructed as shown more particularly in Figs. 2 and 3, open at the ends and engaging end to end, so that their interiors communicate and produce a continuous air space in the vertical walls.

The core members of the bottom of the tank communicate at their ends as shown at 13 with the core members of the vertical walls, so that the air spaces of all the core members communicate.

The core members may be formed of any suitable material, either of wood as shown in Figs. 2 and 4, or of sheet metal, as shown in Fig. 3, and will each preferably be strengthened by an intermediate diaphragm 14, perforated to permit the passage of the air.

The core members are located within the molds when the tank is constructed and remain within the walls of the completed tank, and temporarily supported by blocks 18.

The inner wall of each of the core members of the vertical walls of the tank is shorter than the outer wall to receive the open ends of the bottom core members, to permit the free passage of air between the interiors of the side cores and the bottom cores.

The curving of the bottom of the tank enables it to effectually resist the heaving action of frost.

The dead air spaces in the walls of the tank render them nonconductive to either cold or heat and render the tanks non-freezing in winter and keeps the water cool in summer.

Located within the tank is a conductor pipe 15 extending through the bottom of the tank and into the earth below the frost line and above the upper edge of the tank. The lower end of the pipe 15 is open and may be embedded in loose rocks or the like, represented at 16, to provide for the free entrance of the warmer air, and preferably open at the top and provided with a screen 17 to prevent the entrance of insects or the like. By this means the warmer air within the pipe will prevent the water at the center of the tank from freezing.

A section of tiling 19 will be disposed around the pipe 15 where it passes through the bottom cores before the cementitious material is poured into the mold, to seal the dead air spaces and prevent the entrance of water.

The improved tank can be constructed in smaller sizes for shipment, or erected upon the ground where they are to remain permanently. If erected where they are to remain, the earth will be excavated to receive the curved bottom portion, and the vertical walls constructed in suitable mold devices.

Having thus described the invention, what is claimed as new is:

1. A cement receptacle having hollow bottom and side walls, a hollow core member formed of rigid material disposed within the bottom wall and including upper and lower plates of different lengths, hollow sectional rigid core members disposed within the side walls of the receptacle and each including spaced plates, the inner plates of the side core members being shorter than the outer plates and engaging the upper plate of the bottom core member and the outer plates of the side core members engaging the lower plate of the bottom core member, horizontal plates connecting the inner and outer plates of the side core members and forming closures therefor, spacing members interposed between the plates of the side core members, and a tubular member extending through the bottom of the receptacle and having its lower end embedded in the ground.

2. A cement receptacle having hollow bottom and side walls, a core member disposed within the bottom wall, core members arranged within the side walls and having their upper ends closed, and their lower ends communicating with the core member in the bottom of the tank, there being an opening formed in the bottom wall and in the bottom core member, a bushing seated in said opening, and a tubular member extending through said bushing and having its lower end embedded in the ground.

In testimony whereof I affix my signature.

HILMER N. ENHOLM. [L. S.]